Patented Mar. 22, 1938

2,111,581

UNITED STATES PATENT OFFICE 2,111,581

INSECTICIDES AND SPRAY OILS

Ulric B. Bray, Palos Verdes Estates, Calif., assignor to Union Oil Company of California, Los Angeles, Calif., a corporation of California No Drawing. Application February 27, 1934, Serial No. 713,153

16 Claims. (Cl. 167—28)

This invention relates to materials for use as insecticides, fungicides and for control of pests in general, but particularly for use as plant insecticides, a specific purpose being the control of citrus pests such as red scale.

Objects of the invention are to provide materials for control of insects and similar pests as mentioned, using petroleum fractions which have heretofore been considered worthless for such purposes and thereby conserving spray oil stocks, and particularly to provide insecticidal oils for plant treatment which are substantially non-phytocidal or non-toxic to plant and fruit, may be readily used in ample proportions without endangering or injuring plant, leaves, fruit or wood and may be used without such close regulation as to quantity as has been quite commonly required heretofore.

I have discovered that, so far as petroleum oil fractions are concerned, the toxic or injurious constituents are found in a relatively small range of materials which are removable under certain conditions by sulphuric acid and under certain conditions by organic and inorganic solvents such as liquid sulphur dioxide, phenol, furfural, dichlorethyl ether, chloraniline, sulphur dioxide-benzol mixtures, nitro-benzol, acetone, chlorphenol, cresylic acid, crotonaldehyde and the like. Primarily I have discovered that these toxic or chemically reactive materials which are injurious to plants are not directly removable in an efficient manner from petroleum fractions constituting the stock normally used for spray purposes, apparently for the reason that these materials are too heavily diluted with the oil to permit removal, and I have also discovered that the objectionable toxic or reactive materials must be obtained in some concentrated form before they can be effectively eliminated. Thus, while weak sulphuric acid (i. e. less than about 95% concentration) will not sufficiently remove the objectionable materials from the original spray oil stock, unless used in very large amounts with a resultant high loss of stock to the acid sludge, it will remove the objectionable materials from the solvent extract obtained by treating the stock with the above solvents. The extracts obtained by these solvents contain all the above mentioned objectionable toxic or chemically reactive materials. But I have discovered that not all of this extract is objectionable, and that only that portion which is soluble in and more or less readily removable by said sulphuric acid of less than about 95% strength and/or at temperatures less than 100° F. is objectionable for plant spray uses. Therefore, upon removal of these materials, which are inherently readily soluble in sulphuric acid (particularly the olefinic type of unsaturates), the remaining portion of the extract may be used itself as a spray oil or may be returned to the original solvent treated stock, the resultant blend being used as a spray oil. Similarly these objectionable materials may be removed from the solvent extracts in other ways, for example by a selective solvent treatment with one of the above mentioned solvents, the treating being carried on, for example at a considerably lower temperature than the original treatment and with a different quantity of the solvent so that not all of the extract will be dissolved but only a sufficient portion to insure separation of said objectionable constituents.

Broadly, this invention may be said to reside in a spray oil obtained as a fraction of petroleum by extracting a stock with liquid sulphur dioxide or similar solvent to obtain an extract containing the plant-injurious materials, and then removing from the extract itself those injurious materials, as by extracting them with sulphuric acid under appropriate conditions or cooling the solvent extract without removal of the solvent so as to separate a raffinate from the solvent which retains the objectionable constituents. The treated extract or raffinate freed of the injurious agents may be used as such or by blending with the original solvent-extracted oil.

In connection with this work I have made the very interesting discovery that an extract obtained by one of the above solvents from a spray oil stock, such as from San Joaquin Valley (California) crude oil, and then further extracted with sulphuric acid to produce a raffinate phase from the extract having a De Ong value of only about 8 or 10, makes an excellent spray oil for red scale and the like on citrus fruit even when used without the addition of any other oil. It appears that the objective is the removal of all of the unsaturated, double bonded, or otherwise readily reactive materials from the stock, and that the De Ong value of an oil is not necessarily related to its phytocidal characteristics. (De Ong value may be defined as the unsulphonatable percentage residue of an oil.) The specifications for this test are given in Industrial and Engineering Chemistry, vol. 18 (1926), page 175. Briefly, the oil is treated with sulphuric acid exactly 37 normal (100%) in a water bath at 95° to 100° C.— ordinarily at 210° to 212° F.—for a period of one hour. 20 cc. of the above acid are added to 5 cc. of oil in two dumps in a Babcock cream test bottle, the mix being agitated every 10 minutes. After phase separation, the percentage of unsulphonated residue is the De Ong value.) In the light of my discoveries, it appears that the De Ong test for spray oils is largely a test for aromatic nuclei which can be sulphonated with 100% sulphuric acid at 100° C., as well as a test for reactive and readily acid soluble compounds, and that the presence in a compound of an aromatic nucleus which can be sulphonated by strong acid at superatmospheric temperature is not a criterion of the phytocidal characteristics of the compound. In other words, there are two general types of compounds soluble in sulphuric acid in the De Ong test with 100% acid at 100° C., namely, the unsaturates or readily reactive materials and the aromatic compounds. Only those which can be classified as unsaturates or otherwise chemically reactive appear to be strictly toxic to the plant. By solvent treating the spray oil stocks, to produce a high De Ong test raffinate, both of the foregoing types of materials are removed as an extract, but according to my invention the extract is separated further into chemically reactive (phytocidal) and relatively non-reactive (non-phytocidal) components, and the relatively non-reactive components (non-phytocidal) are used as a spray oil directly or in admixture with the solvent raffinate.

In view of the foregoing, when I use the term "chemically reactive", I refer to those materials which are injurious to plants when used thereupon as spray oils, either in the well known and customary form of emulsions or in any other form suitable for application.

To indicate more concretely the nature of spray oil obtained according to my present invention, it may be stated that the usual 1½% to 2% emulsion using ammonium caseinate as an emulsifier, was prepared, and oranges and leaves carrying red scale were dipped into the emulsion without severing from the tree. After a period of weeks no objectionable influences had exhibited themselves and a complete kill of the scale had resulted. The oil used in this case had a De Ong value between 8 and 10 and was the above described oil obtained from Edeleanu extract from the usual petroleum spray oil stock by washing said Edeleanu extract with sulphuric acid of the proper strength and at the proper temperature. Although this upsets some of the previous theories regarding De Ong values, the tests nevertheless have been conclusive. Such an oil may also be applied without emulsification as by means of a fog created about the plant or fruit and thereby caused to attach itself sufficiently.

Considering the invention in greater detail, I prepare spray oils by first following the usual procedure of extracting petroleum spray oil stock with a solvent such as liquid sulphur dioxide (e. g. 100 volume percent of liquid $SO_2$ at 30° F.), to form a raffinate phase and an extract phase, separating the solvent extract phase (which in the case of sulphur dioxides is commonly known as Edeleanu extract) from the raffinate phase, and treating the raffinate phase in the usual manner by distilling to recover solvent, neutralizing with caustic soda solution and clay treating. This treated raffinate is commonly used as a spray oil.

Instead of discarding the solvent extract phase as a spray oil stock after recovering the solvent, (as has been done heretofore), I treat the extract phase with a sulphuric acid under what may be considered mild, controlled conditions to avoid substantial sulphonation of the extract and to effect the removal of only the most reactive material in the acid sludge, e. g. the olefinic type of unsaturates. Acid strengths of 75 to 98% $H_2SO_4$ by weight may be employed but with the higher strength acids it is necessary to keep the temperature from rising appreciably above atmospheric in order to avoid sulphonation and loss of the inherently less reactive and therefore valuable material. In a specific operation I employed an acid concentration of about 98%. This acid treatment was carried on as follows: An Edeleanu extract oil was cooled to a temperature of about 60° F. and then treated with 25 lbs. of 98% acid per barrel of extract oil. The sludge was allowed to settle out and was withdrawn. The treatment was repeated with a second and a third portion of acid identical with first used in the first dump—care being taken to prevent the temperature from rising above 90° F. After the final sludge separation, the acid treated oil was neutralized by washing with dilute caustic soda solution at a temperature of 160° F. Salts and soaps were then removed by water washing at about the same temperature in a manner well known to those skilled in the art of acid treating viscous petroleum distillates. The oil was then treated with 2% by weight of Death Valley clay at 275° F. The yield of recovered oil was 61.5% by volume of the Edeleanu extract.

This extracted oil, being thus a sulphuric-acid-treated liquid-$SO_2$-extract, constituted the spray oil material of the present invention. It was made up into a water emulsion with ammonium caseinate as an emulsifier, using about 50% oil to produce the usual emulsion paste, which was then diluted with water in a ratio of about 20 to 1 to produce about a 2% diluted emulsion. This 2% diluted emulsion was then employed as a spray for citrus fruit and trees and in certain cases fruit and leaves were immersed for a few minutes in the emulsion, said fruit and leaves after a period of several weeks being in perfect condition. The red scale of course was killed.

In addition to using this extract as a spray oil, it is also used by adding it to the original sulphur dioxide treated spray oil in varying proportions, the whole blend of these two oils being employed in the preparation of a spray emulsion. By adding to the original spray oil a sufficient amount of the sulphuric acid treated extract obtained according to the present invention, substantially the same desirable results are reached as with the present extract itself. Whereas the original $SO_2$-extracted spray oil is a highly paraffinic petroleum fraction low in unsaturates and non-injurious to plants and having a high De Ong value (content of saturated materials) e. g. 90 or above, the sulphuric-acid-treated extract is highly aromatic, has a low De Ong value, e. g. 8 to 10, but is likewise non-injurious to plants.

The acid extracted Edeleanu extract (liquid sulphur dioxide extract) obtained as above described and having a De Ong value between 8 and 10, had a gravity of about 13° A. P. I. and a Sligh oxidation test of 20 corresponding to very good stability against oxidation. When this treated extract obtained from a given batch of spray oil is returned to the same raffinate (about 28° to 30° A. P. I.) from which it was obtained, a very satisfactory spray oil results, this oil being around 25° to 26° A. P. I. and having a resultant De Ong value of about 77 as against a De Ong value of approximately 90 for the raffinate alone. (Specifications for the Sligh oxidation test, are defined in A. S. T. M. Proceedings, vol. 27 (1927)

part I, page 461. Briefly, 10 grams of oil are placed in an oxygen filled flask which is sealed at atmospheric pressure and immersed in an oil bath at 200° C. for 2½ hours. Following cooling, the oil is diluted to 100 m. l. with standard A. S. T. M. precipitating petroleum naphtha, shaken and allowed to precipitate while standing for 1 hour at 25° C.±2°. The residue is filtered out and weighed. The percentage thereof multiplied by 100 is the Sligh oxidation number.)

In addition to preparing the present spray oil extract with sulphuric acid as above described, it may be also prepared by further treating the original solvent extract with quantities of liquid solvent under controlled conditions. For example, where an original Edeleanu extract is obtained by treating a spray oil stock with 100 volume percent. liquid $SO_2$ at $+30°$ F., the resultant Edeleanu extract is recovered, and cooled down to $-30°$ F. with or without removal of any of the liquid sulphur dioxide, with the result that a raffinate phase precipitates out, which raffinate phase is recovered to constitute the new spray oil of the present invention. By permitting the loss of a portion of the liquid sulphur dioxide, an additional quantity of raffinate is precipitated.

After recovery of the raffinate from this procedure and proper neutralization it may be used as a spray oil either in that form or by adding it to the original $SO_2$-extracted spray oil, as above stated.

It is also to be noted that for many insecticidal purposes, where plants are not involved, the original Edeleanu extract itself may be employed as a spray oil with excellent toxic effects without any second treatment thereof whatever.

In the foregoing illustrations, where I have described solvent extraction of the original spray oil stock by the Edeleanu process involving liquid $SO_2$ to produce the extract from which I recover valuable low A. P. I. gravity and low De Ong test spray oils which are non-injurious to plants, it is to be understood that in place of the initial Edeleanu (liquid sulphur dioxide) extraction of the raw stock, I may employ all other suitable solvent processes such as those employing phenol, furfural, dichlorethyl ether, chloraniline, liquid sulphur dioxide-benzol, nitrobenzol, acetone, chlorphenol, cresylic acid and crotonaldehyde. The amount of solvent used may be varied; ordinarily between 100 and 200 volume percent. of solvent will be employed (i. e. 1 to 2 volumes of solvent per volume of oil). In each case the extract is re-treated to recover the valuable constituents constituting my invention. This retreatment may be accomplished by treatment with sulphuric acid under mild conditions as above indicated, or by treatment with any one of the other solvents under such conditions as will extract the toxic materials without taking into solution all of the material being treated. In employing the above mentioned solvents in most cases preference will be given in the order in which the solvents are named above in this paragraph, conditions of cost and the like not being considered. Treating temperatures for these different solvents will vary, and also temperatures will vary according to the nature of the stocks being treated. In general however the following temperatures may be taken as representative of the general average: for liquid sulphur dioxide, about 30° F.; for phenol about 115° F.; for furfural, about 110° F.; for dichlorethyl ether, about 40 to 80° F.; for chloraniline and chlorphenol, about 30° F.; for liquid sulphur dioxide-benzol mixtures, about 10° F.; for nitrobenzol, about 40 to 70° F.; for acetone, about 40° F.; for cresylic acid, about minus 10° F.; and for crotonaldehyde, about 30° F. Where these solvents are employed in treating the extracts for removal of their toxic content, correspondingly lower temperatures will be employed in order to precipitate out the desired raffinate fractions and retain in the solution only a relatively small quantity of the raffinate material with the toxic materials which are required to be dissolved out. Temperatures for initial solvent treatment of the spray oil solution, and for the subsequent cooling of the extract containing the solvent to precipitate out the desired raffinate from the toxic materials, may of course vary considerably as above indicated and as will be evident to the skilled operator. The temperature differential between the original extraction and the precipitation of the second raffinate from the toxic constituents likewise may be varied according to the solvent being used, the stock being treated, and the quality of the products required.

In preparing spray oils according to this invention it is possible to use a wide range of stocks. For example the stock originally to be treated by a solvent may be a distillate of 25 to 26° A. P. I. from a San Joaquin Valley (California) crude, or a distillate of about 28° A. P. I. from a Santa Fe Springs (California) crude. The raffinate obtained from the former will have an A. P. I. gravity of about 28½°, and that from the latter about 30°. In either case one to two volumes of solvent may be used. The extract obtained by the solvent, for example by liquid sulphur dioxide, will have a gravity of about 11° A. P. I., and after treatment to remove the toxic materials, for example by sulphuric acid as above described, will have a gravity of around 13° to 15° A. P. I. In general the gravity will fall under 18° A. P. I. at 60° F. and the extract will have a viscosity less than 150 seconds Saybolt Universal at 100° F. The De Ong value of such extracts will ordinarily be within the limits of 5 to 20, but may run as high as 30 with some stocks. The sulphuric acid treatment, as has been indicated above, is such as to remove adequately materials toxic to plants, and this may be readily accomplished under mild conditions. While the sulphuric acid concentrations may be relatively high, for example as high as 95% or even as high as 98% if temperatures are not allowed to rise above about 90° F., nevertheless lower concentrations within the range of from around 60% to 90% may be employed, the temperature however being preferably correspondingly limited as above indicated.

In blending the treated extract oil of this invention with the solvent extracted spray oil from which the extracts are obtained, various proportions may be employed. Ordinarily the treated extract probably would not be added to the extracted spray oil in quantity much greater than that corresponding to the portion removed from the extracted spray oil. However there are no limits upon this blending, and the resultant De Ong value and the gravity will vary according to the blend. For example about 80% of an extracted spray oil having a De Ong value of 90 and a gravity of 30° A. P. I. could be blended with 20% of a low De Ong value of a treated extract having a De Ong value of 8 to 10 and gravity of 13° A. P. I. to produce a blend having a gravity of 25° to 28° A. P. I. and a De Ong value of around 75. In general the De Ong value of these blends will run below 80.

It is to be understood that the above disclosures are to be taken merely as illustrative of the generic invention, and not as limiting.

I claim:

1. A non-phytocidal spray oil comprising a solvent extract of aromatic character from a mineral oil distillate, said extract being soluble in liquid sulphur dioxide and free of constituents removable with sulphuric acid under mild conditions, in the order of 75% to 98% concentration at 60° to 100° F. and containing constituents removable by sulfuric acid but only under more severe treating conditions in the order of 98% acid at temperatures above about 100° F.

2. A non-phytocidal spray oil comprising a solvent extract of petroleum distillate, the extract being soluble in liquid sulphur dioxide and being free from chemically reactive materials removable by sulphuric acid of concentrations less than about 98% and at temperatures below about 100° F. and containing those aromatic constituents removable by sulfuric acid under more severe conditions in the order of acid concentration of at least 98% used at temperatures above about 100° F.

3. A mineral spray oil comprising a petroleum distillate fraction substantially entirely soluble in liquid sulphur dioxide at 30° F. and substantially entirely insoluble in liquid sulphur dioxide at temperatures around 30° below 0° F.

4. A non-phytocidal spray oil comprising a petroleum distillate fraction largely soluble in liquid sulphur dioxide at 30° F., and substantially insoluble in liquid sulphur dioxide at minus 30° F. and having a gravity approximating 13° A. P. I.

5. A non-phytocidal mineral spray oil comprising a petroleum distillate fraction substantially entirely soluble in liquid sulphur dioxide at 30° F. and substantially entirely insoluble in liquid sulphur dioxide at −30° F. and having a De Ong value below about 30.

6. A spray oil comprising a mineral oil fraction of claim 3 and a petroleum fraction substantially free from constituents soluble in liquid sulphur dioxide at 30° F., the combined oil having a De Ong value less than about 80.

7. A non-phytocidal spray oil comprising a petroleum fraction largely soluble in liquid sulphur dioxide and free from materials soluble in sulphuric acid under mild conditions in the order of 98% concentration at 60° to 90° F., the oil having a gravity under about 18° A. P. I. at 60° F., and a viscosity less than about 150 seconds Saybolt Universal at 100° F.

8. A spray oil comprising an emulsion of a non-phytocidal mineral oil fraction together with a liquid sulphur dioxide soluble mineral oil fraction substantially free from constituents removable with sulphuric acid of concentration of about 95%.

9. A method for preparing a spray oil comprising extracting a mineral oil distillate fraction with a solvent to remove substantially all constituents soluble in liquid sulphur dioxide, separating the extract from the raffinate, treating the extract to remove therefrom substantially all constituents soluble in sulphuric acid under mild conditions in the order of 95% to 98% concentration at a temperature of about 60° to 90° F., and separating the sulphuric acid-removable constituents from the resultant raffinate.

10. An insecticidal oil comprising an aromatic fraction obtained as a solvent extract from petroleum soluble in liquid sulphur dioxide and being substantially free from the type of materials removable by sulphuric acid at 60° F. to 100° F. having a concentration between about 75% and 98%.

11. A non-phytocidal mineral spray oil containing aromatic fractions non-toxic to plants and free from unsaturates of olefinic nature, the oil having a gravity between about 13° and 18° A. P. I., a viscosity of less than about 150 seconds Saybolt Universal at 100° F., and a De Ong number between about 5 and 20.

12. A non-phytocidal spray oil comprising a petroleum fraction having a De Ong value above about 90 in combination with a smaller quantity of a mineral oil fraction containing aromatic fractions non-toxic to plants and free from unsaturates of olefinic nature, the oil fraction containing aromatic fractions having a gravity between about 13° and 18° A. P. I., a viscosity of less than about 150 seconds Saybolt Universal at 100° F., and a De Ong number between about 5 and 20, the blend of the two oils having a De Ong number below about 80.

13. An oil according to claim 11 which is substantially entirely soluble in liquid sulfur dioxide at 30° F. and substantially entirely insoluble in liquid sulfur dioxide at minus 30° F.

14. A mineral spray oil comprising a major proportion of a non-phytocidal petroleum oil distillate together with a minor proportion of a liquid sulphur dioxide soluble mineral oil distillate fraction substantially free from constituents removable with sulphuric acid of a concentration between about 75% and 98% at temperatures between about 60° F. and 100° F.

15. A non-phytocidal mineral spray oil comprising a petroleum distillate fraction largely soluble in at least an equal volume of liquid sulfur dioxide at 30° F., and substantially insoluble in such liquid sulfur dioxide at −30° F., and having a gravity approximating 13° A. P. I.

16. A non-phytocidal mineral spray oil comprising a petroleum distillate fraction largely soluble in at least an equal volume of liquid sulfur dioxide at 30° F., and substantially insoluble in such liquid sulfur dioxide at −30° F. and having a De Ong number below about 30.

ULRIC B. BRAY.